United States Patent
Shteingart et al.

(10) Patent No.: US 10,504,035 B2
(45) Date of Patent: Dec. 10, 2019

(54) REASONING CLASSIFICATION BASED ON FEATURE PERTUBATION

(71) Applicant: Microsoft Technology Licensing, LLC, Redmond, WA (US)

(72) Inventors: Hanan Shteingart, Herzliya (IL); Yair Tor, Redmond, WA (US); Eli Koreh, Tel Aviv (IL); Amit Hilbuch, Kfar Saba (IL); Yifat Schacter, Tel Aviv (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1013 days.

(21) Appl. No.: 14/748,211

(22) Filed: Jun. 23, 2015

(65) Prior Publication Data

US 2016/0379133 A1 Dec. 29, 2016

(51) Int. Cl.
*G06N 20/00* (2019.01)
(52) U.S. Cl.
CPC .................... *G06N 20/00* (2019.01)
(58) Field of Classification Search
None
See application file for complete search history.

(56) References Cited

U.S. PATENT DOCUMENTS

| | | | | |
|---|---|---|---|---|
| 5,873,824 A * | 2/1999 | Doi | ............ | G06K 9/00 128/925 |
| 7,577,709 B1 * | 8/2009 | Kolcz | ............ | G06K 9/6217 706/20 |
| 7,720,781 B2 | 5/2010 | Forman | | |
| 7,853,599 B2 * | 12/2010 | Liu | ............ | G06F 17/30675 707/748 |
| 8,355,997 B2 * | 1/2013 | Kirshenbaum | ............ | G06N 5/02 706/12 |
| 8,417,648 B2 | 4/2013 | Hido et al. | | |
| 9,189,750 B1 * | 11/2015 | Narsky | ............ | G06N 99/005 |
| 9,607,272 B1 * | 3/2017 | Yu | ............ | G06N 99/005 |
| 9,805,256 B2 * | 10/2017 | Alcoverro Vidal | ............ | G06K 9/00355 |
| 2002/0147694 A1 * | 10/2002 | Dempsey | ............ | G06K 9/6256 706/12 |

(Continued)

OTHER PUBLICATIONS

Syed et al., "Incremental Learning with Support Vector Machines", 1999, Citeseer, pp. 1-6 (Year: 1999).*

(Continued)

*Primary Examiner* — Paulinho E Smith
(74) *Attorney, Agent, or Firm* — Alleman Hall Creaseman & Tuttle LLP (57) ABSTRACT

Disclosed herein is a system and method that can be used with any underlying classification technique. The method takes into account both the value of the current feature vector. It is based on evaluating the effect of perturbing each feature by bootstrapping it with the negative samples and measuring the change in the classifier output. To assess the importance of a given feature value in the classified feature vector, a random negatively labeled instance is taken out of the training set and replaces the feature at question with a corresponding feature from this set. Then, by classifying the modified feature vector and comparing its predicted label and classifier output a user is able measure and observe the effect of changing each feature.

18 Claims, 3 Drawing Sheets

(56) References Cited

U.S. PATENT DOCUMENTS

| | | | | |
|---|---|---|---|---|
| 2008/0069437 | A1* | 3/2008 | Baker | G06K 9/6256 382/159 |
| 2012/0204020 | A1* | 8/2012 | Novak | H04L 63/1433 713/2 |
| 2012/0284213 | A1* | 11/2012 | Lin | G06N 99/005 706/12 |
| 2013/0254153 | A1* | 9/2013 | Marcheret | G06N 99/005 706/59 |
| 2014/0229164 | A1* | 8/2014 | Martens | G06F 17/241 704/9 |
| 2016/0379133 | A1* | 12/2016 | Shteingart | G06N 99/005 706/12 |
| 2016/0379135 | A1* | 12/2016 | Shteingart | G06N 99/005 706/12 |

OTHER PUBLICATIONS

Lemaire, et al., "Correlation Analysis in Classifiers", In Proceedings of 4th IAPR TC3 Workshop on Artificial Neural Networks in Pattern Recognition, May 11, 2010, 18 pages.

Sikonja, et al., "Quality of Classification Explanations with PRBF", In Proceedings of Neurocomputing, vol. 96, Nov. 2012, 21 pages.

Strumbelj, et al., "An Efficient Explanation of Individual Classifications using Game Theory", In Journal of Machine Learning Research, vol. 11, Jan. 2010, 18 pages.

Bosnic, et al., "Mining Data from Hemodynamic Simulations for Generating Prediction and Explanation Models", In IEEE Transactions on Information Technology in Biomedicine, vol. 16, Issue 2, Mar. 2012, pp. 248-254.

Martens, et al., "Explaining Documents' Classifications", In Working paper CeDER-11-01, Dec. 16, 2014, 39 pages.

Biran, et al., "Justification Narratives for Individual Classifications", In Proceedings of International Conference on Machine Learning, Jun. 21, 2014, 7 pages.

Martens, et al., "Explaining Data-Driven Document Classifications", In Journal MIS Quarterly, vol. 38, Issue 1, Mar. 2014, 54 pages.

Sikonja, et al., "Explaining Classifications for Individual Instances", In IEEE Transactions on Knowledge and Data Engineering, May 2008, 11 pages.

Subianto, et al., "Understanding Discrete Classifiers with a Case Study in Gene Prediction", In Proceedings of Seventh IEEE International Conference on Data Mining, Oct. 28, 2007, pp. 661-666.

* cited by examiner

REASONING CLASSIFICATION BASED ON FEATURE PERTUBATION

BACKGROUND

Classifiers are used in many systems to take a data set and generate one or more conclusions or classifications based on the data set. For example, a data set may be classified as indicating a fraudulent transaction after being passed through a classifier, or medical information can be passed through a classifier that then indicates the probability that a patient has a certain condition. Many of these systems may employ machine learning to tune the classifier. This requires the provisioning of a training set of data that has known results.

In many machine learning systems in general, and binary classification in particular, it is difficult understand what the reason is for a particular output classification to be for example, positive rather than negative. For example, in a fraud detection system, a human reviewer might want to know the reason or reasons an automatic fraud detection system labeled a user or a transaction as fraudulent. The current solution is to manually analyze the classification model and understand what lead to the observed output.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present disclosure presents a system and method that can be used with any underlying classification technique. The method takes into account both the value of the current feature vector. It is based on evaluating the effect of perturbing each feature by bootstrapping it with the negative (opposite) samples and measuring the change in the classifier output. For instance, assume classification of a feature vector of a positively labeled instance. To assess the importance of a given feature value in the classified feature vector, a random negatively labeled instance is taken out of the training set and replaces the feature at question (i.e. the one of the features in the positively labeled feature vector) with a corresponding feature from this set. Then, by classifying the modified feature vector and comparing its predicted label and classifier output (score and/or label) it is possible to measure and observe the effect of changing each feature. This measure can be used to rank the features by their effect on the observed label and output. Thus, the manual reviewer now can assess the contribution of each feature by its value, rank and effect size in a quick and efficient manner.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. This is distinct from computer storage media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media, but not within computer storage media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

In many machine learning systems in general, and binary classification in particular, there is a need to decipher or understand what the reason is for deciding the output classification is positive (e.g. fraud in cyber security or illness in medicine) rather than negative (e.g. genuine in cyber security or healthy in medicine). For example, in a fraud detection system, the human reviewer might want to know the reason or reasons an automatic fraud detection system labeled a user as fraudulent. One tedious solution is to analyze the classification model and understanding what lead to the observed output. With modern machine learning this analysis becomes challenging and requires specialists. This is especially true when using models which don't assume data feature independence.

The present disclosure presents method which can be used with any underlying classification or regression technique. The method takes into account both the value of the current feature vector. It is based on evaluating the effect of perturbing each feature by bootstrapping it with the negative (opposite) samples and measuring the change in the classifier output. For instance, assume classification of a feature vector of a positively labeled instance. To assess the importance of a given feature value in the classified feature vector, a random negatively labeled instance is taken out of the training set and replaces the feature at question (i.e. the one of the features in the positively labeled feature vector) with a corresponding feature from this set. Then, by classifying the modified feature vector and comparing its predicted label and classifier output (score and label) it is possible to measure and observe the effect of changing each feature. This measure can be used to rank the features by their effect on the observed label and output. Thus, the manual reviewer now can assess the contribution of each feature by its value, rank and effect size in a quick and efficient manner.

Figure 1:
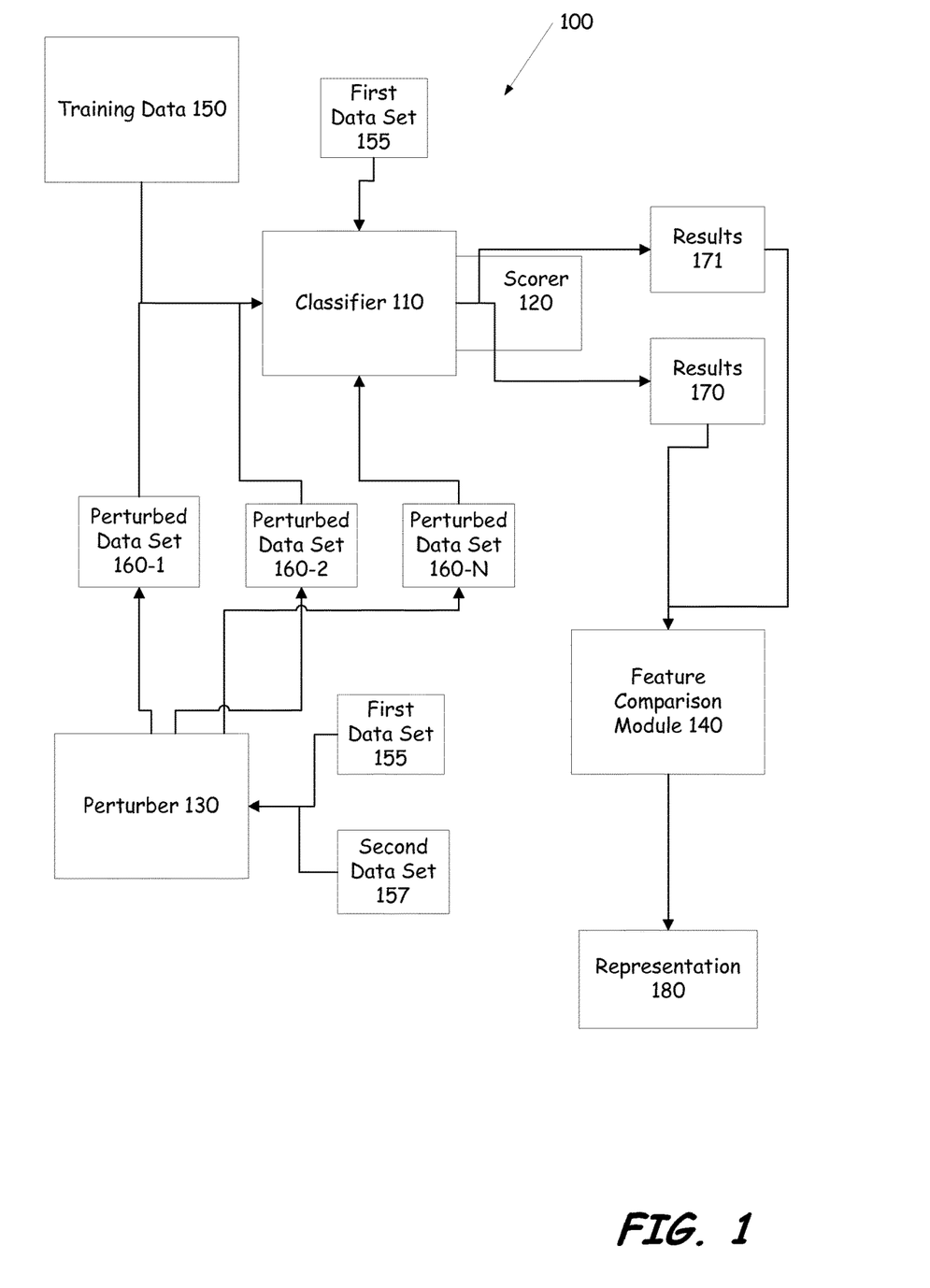
FIG. 1 is a block diagram of a system for determining which features of a data set are the features that determine a particular output of the data when the data is passed through a classifier according to one illustrative embodiment.

FIG. 1 is a block diagram of a system for determining which features of a data set are the features that determine a particular output of the data when the data is passed through a classifier 110. This system may allow for the determination of whether a data set that has missing values can be processed or not. Specifically, if the missing data values or features are determined to be not important or have minimal to no impact on the overall results the data can be processed with high confidence. If the missing data points or features have an impact on the overall results the system can either not process the data or can add values for the data into the data set. The system includes a classifier 110, a scorer 120, a perturber 130, a feature comparison module 140 and a set of training data 150.

The classifier 110 is a component of the system that is configured to classify a data set according to a set of rules. The set of rules that are used by the classifier 110 are designed to look at the data set that is input and each feature of the data set and determine a particular output based on the combination of the features of the data set. For example, the classifier 110 may be configured to determine if a transaction is a fraudulent transaction. In this instance each of the features that appear in the data set provide information to the classifier 110 as to if the transaction is or is not fraudulent. The classifier 110 is trained using training data 150 that has features in the training data 150 that should result in a particular result from the classifier 110. The more training data 150 that is processed through the classifier 110 the more the classifier 110 is able to tune or modify the rules that are used to generate a particular output. The classifier 110 can use any rules or processes available to classify or otherwise produce the output from the input data, such as training data 150, first data set 155 and second data set 157 as input and results 170 and 171 and output.

The output 170/171 of the classifier 110 can simply contain the determined result. That is, for example, in the case of a fraud transaction that the transaction is fraud or is not fraud. However, in some embodiments the output also includes a probability that the determination by the classifier 110 is in fact correct. To obtain the probability the classifier 110 passes the output through a scorer 120. The scorer 120 can be part of the classifier 110 or it may be a separate component of the system. The scorer 120 is configured to calculate the likelihood that the classifier 110 has produced the correct result. Alternatively the scorer 120 is configured to identify the portion of the results that caused the classifier 110 to classify the result in the manner that it did. For example if the classifier 110 merely outputs a score for the classification and that score is compared to a rule for the decision, the scorer 120 can calculate the delta between the determined score and the score needed to cause the decision to be made. The scorer 120 can use any method, process or means for calculating the probability or score.

The perturber 130 is a component of the system that is configured to take one data set (e.g. first data set 155) in the test data and change or modify one of the features that make up that data set with a corresponding feature from another one of the data sets in the test data. Specifically, the perturber 130 identifies a random data set such as second data set 157 in the training data 150 that results in the opposite result from the first data set 155 when pushed through the classifier 110. This second data set 156, because it results in the opposite result as the first data set 155, is known to have features in it that cause this opposite result. The perturber 130 swaps a first feature in the first data set 155 with the corresponding first feature in the second data set 156 to create a perturbed data set 161-1. The perturber 130 repeats this process for each of the features in the first data set 155, to create additional perturbed data sets 161-2, 161-N (all collectively referred to herein as perturbed data set 161). This process can also be repeated several times for the same feature in an attempt to gain better statistics for the feature. In some embodiments the perturber 130 can select multiple features to replace in creating a perturbed data set 161. This approach with regards to multiple data sets can help identify situations where a group of features while individually not important to the overall classifier 110 decision when considered together may have significant or noticeable effects on the output of the classifier 110.

The feature comparison module 140 is a component of the system that is configured to receive the output from the classifier 110 from each of the perturbed data sets 161 and to compare the results 171 of that classification with the results 170 from the original classification of the un-perturbed data set (i.e. first data set 155). For each feature in the data set the feature comparison module 140 computes a deviation statistic for that feature such as mean label or score deviation. This deviation statistic indicates or represents the change caused by the subbing of the particular feature. The results 171 from the classifier 110 may indicate that the particular feature caused the change to be more or less in favor of a particular result. That is the result may be stronger towards the original result for the first data set 155 or move the score closer to the opposite result.

The feature comparison module 140 identifies the feature or features in the perturbed data set that was changed and compares that feature with the original feature of the first data set 155. In this way the feature comparison module 140 can identify the amount of change that occurred when the feature was subbed out. This allows for the system to judge the overall impact of a specific feature change beyond the actual change in the score. If the two features used are actually quite close, then the expectation would be that there would be little to no change in the classification. This closeness can cause a specific feature to be missed, but also allows for a determination if additional analysis may be needed using a different opposite data set. The feature comparison module 140 builds a table of features and the corresponding probabilities received for the perturbed data sets such that the impact of the feature on the results can be observed, reported and displayed as a representation 180. In some approaches the feature comparison module 140 may receive results from the use of multiple different data sets from the training data 150. In this instance the feature scorer can aggregate the effects of each of the features in the overall report or representation 180. By doing this the effects of a particular feature from the negative result is normalized.

The set of training data 150 is a set of data that is used to train the classifier 110. The training data 150 has a number of data sets that are designed to produce a first result and a number of data sets that are designed to produce a second result. Depending on the intent of the classifier 110 there may be more training data 150 data sets that are designed to produce different results. This can occur, for example, in certain types of medical data where certain features can indicate one result, but a slight change in one or more of the features could result in many different conclusions. Each of the data sets in the training data 150 has a number of features that are present in the data set that help cause the data set to cause the classifier 110 to report the particular data set in a particular way. By passing each of the training data 150 sets through the classifier 110 the classifier 110 is able to become calibrated to the specific data results that the user or other organization desires.

Figure 2:
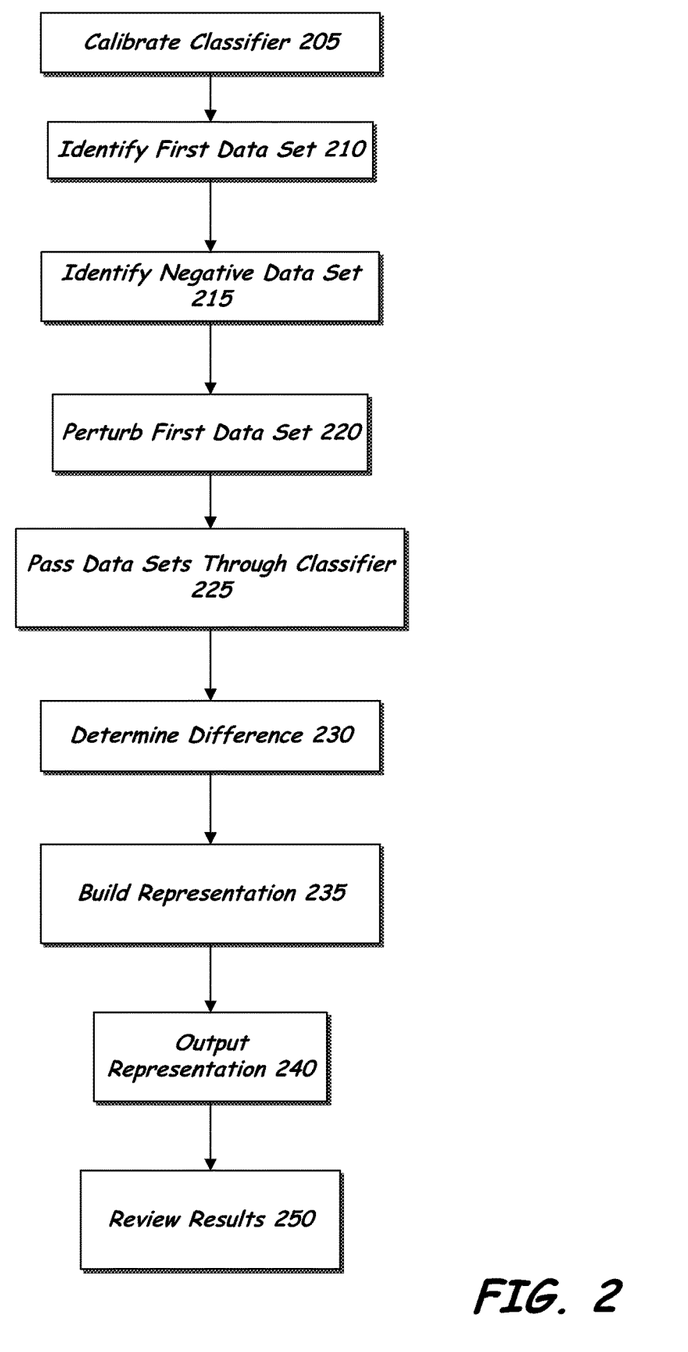
FIG. 2 is a flow diagram of a process of identifying key features in a data set that determine the output of the classifier according to one illustrative embodiment.

FIG. 2 is a flow diagram of a process of identifying key features in a data set that determine the output of the classifier 110 according to one illustrative approach.

The process begins by training the classifier 110. This is illustrated at step 205. At this step in the process the training data 150 is processed through the classifier 110. The classifier 110 reports on the results of each of the training data 150 sets. A user or other system reviews the results from each of the processed data sets and makes adjustments to the rules used by the classifier 110 to cause the classifier 110 to report correctly on each of the inputted data sets. The process to calibrate the classifier 110 can be any training process available.

Once the classifier 110 has been trained the next step is to identify a first data set 155 to analyze. This first data set 155 can be a data set that already exists in the training data 150 or can be a new data set that exists in the world outside of the training data 150. The identification of the first data set 155 is illustrated at step 210. If the first data set 155 has not previously been passed through the classifier 110 the first data set 155 is passed through the classifier 110 at this step as well. This ensures that a baseline result of the first data set 155 has been achieved. This also helps in the later selection of a second data set 156 as the negative result is now known.

Next the process identifies one or more data sets in the training data 150 that produce the negative or opposite result as the first data set 155 when processed through the classifier 110. The negative data set can also be a negative data set that has been previously processed through the classifier 110 and is not part of the training data 150. This is illustrated at step 215. It should be noted that the identification of the negative data set is an optional step as some of the approaches employed by the perturber 130 do not need the negative data set.

Once the negative data set has been identified, the first data set 155 and the negative data set are provided to the perturber 130. The perturber 130 proceeds to modify or perturb the first data set 155 in some manner so that the features that most affect the output from the classifier 110 can be identified. This is illustrated at step 220

In one approach the perturber 130 proceeds to perturb the first data set 155 with features from the negative data set. In this approach the perturber 130 takes a feature from the first data set 155 and replaces it with the corresponding feature from the negative data set. This results in the creation of a perturbed data set whereby all but one of the features in the first data set 155 remain unchanged. The perturber 130 repeats this process for each of the features that are found in the first data set 155 and may also repeat the process for the same feature as well. This results in the creation of a plurality of perturbed data sets. Typically, the number of features dictates the number of perturbed data sets that are created for the first data set 155. However, in some instances the negative data set may not have values for a particular feature or conversely the first data set 155 may be missing that particular feature from its data set. In these case the perturber 130 can either skip the missing feature or can remove the feature (or add in) to the perturbed data set. In another approach that is similar to the replacement of a single feature the perturber 130 can replace two or more features at the same time. This can be useful in situations where a number of features have been determined or are found to already be related or part of a group. Or it may occur in instances where taken individually it is known that the feature is not important but when tied with other features it has some impact. These families of features may be found for example, by testing the effect of the removal or substitution of the members of the family together versus the independent removal or substitution of each feature.

In yet another approach the perturber 130 modifies the first data set 155 without the need for the negative data set. In this approach the perturber 130 uses a recursive approach to find the features that are the most influential on the classification by the classifier 110. The perturber 130 removes the feature from the first data set 155 to create the perturbed data set. This process is repeated for each of the features in the first data set 155 thereby creating the set of perturbed data sets. In removing the feature the perturber 130 can simply cause the feature to have a zero value or it can remove it completely from the data set as if the feature was never there. In yet another approach that does not require a negative data set the perturber 130 goes through each of the features of the data set and removes all but one of the features to create the first perturbed data set. The perturber 130 then proceeds to add one additional feature to the perturbed data set in creating additional perturbed data sets. This process can be repeated in some approaches using a different feature as the starting feature.

The perturber 130 can, in some approaches, use pair-wise correlation of features. In this approach the perturber 130 replaces features values based on the remaining feature values. That is the perturber 130 acts by regressing the value of the particular feature to be used according to the value of the other features form the negative data set. In this approach, the feature is replaced with a conditional distribution given the other features rather a marginal one.

Regardless of which approach is used by the perturber 130 to generate a set of perturbed data sets for the first data set 155, each of the perturbed data sets is passed through the classifier 110. This is illustrated at step 225. The classifier 110 takes each of the perturbed data sets and determines the corresponding output for each of the perturbed data sets. The classifier 110 uses the rules and processes that it was calibrated to use earlier and does not alter or change its methodology. This result includes the associated probability score for the data set generated by the scorer 120.

Once the perturbed data has been processed through the classifier 110 the results of each classification are provided to the feature comparison module 140 to determine the difference in the output of the classifier 110 based on the change in particular feature or features. This is illustrated at step 230. Also at this time the feature comparison module 140 receives the original version of the first data set 155 as well as all of the perturbed data sets that were passed through the classifier 110. The feature comparison module 140 identifies the feature or features in the perturbed data set that was changed and compares that feature with the original feature of the first data set 155. In this way the feature comparison module 140 can identify the amount of change that occurred when the feature was subbed out. For each feature in the first data set 155 the feature comparison module 140 computes a deviation statistic for that feature such as mean label or score deviation. Again the identification of the features is based on the perturbed data set and the associated changed feature in the data set. This deviation statistic indicates or represents the change caused by the subbing of the particular feature. The results from the classifier 110 may indicate that the particular feature caused the change to be more or less in favor of a particular result. That is the result may be stronger towards the original result for the first data set 155 or move the score closer to the opposite result.

The feature comparison module 140 builds a table (or other representation) of features and the corresponding probabilities received for the perturbed data sets. This is illustrated at step 235. At this step the feature comparison module 140 builds the representation such that the impact of the feature on the results can be observed, reported and displayed. In some approaches the feature comparison module 140 may receive results from the use of multiple different data sets from the training data 150. In this instance the feature scorer can aggregate the effects of each of the features in the overall representation. By doing this the effects of a particular feature from the negative result is normalized. In some approaches the feature comparison module 140 can highlight those features where the normalization process had the greatest effect. This could be where in some of the data sets that feature had more of an impact than in others, such as where the value associated with the feature was significantly different than the value that was present in the first data set 155.

The representation that was generated by the feature comparison module 140 is output. This is illustrated at step 240. The output could be simply storing the representation in a data storage system for later retrieval. The output could be formatted and displayed to a user on a display device associated with a computing device. In some approaches the representation may be limited to a select number of features to prevent overloading the representation when viewed by a user. The feature comparison module 140 may only store in the representation those features where the difference determined exceeds a particular threshold. Alternatively or in combination the feature comparison module 140 may only include in the representation a certain number of features that exceed the threshold.

At step 250 a user or other administrator can review the representation. They can also make changes to the classifier 110 and/or the data sets based on the information that is contained in the representation. For example, if they are able to identify a subset of features that drive the results and a second subset of the features that do not drive the results the administrator could determine that the second subset of features does not need to be collected or included in the data sets. This can allow for a more efficient process of both collecting the data from the sources of the data and also speeding up the processing as less data is needed by the system to achieve the same or substantially similar results. The user can also see through the representation possible area where minor data manipulation of a feature can cause a different result.

Figure 3:
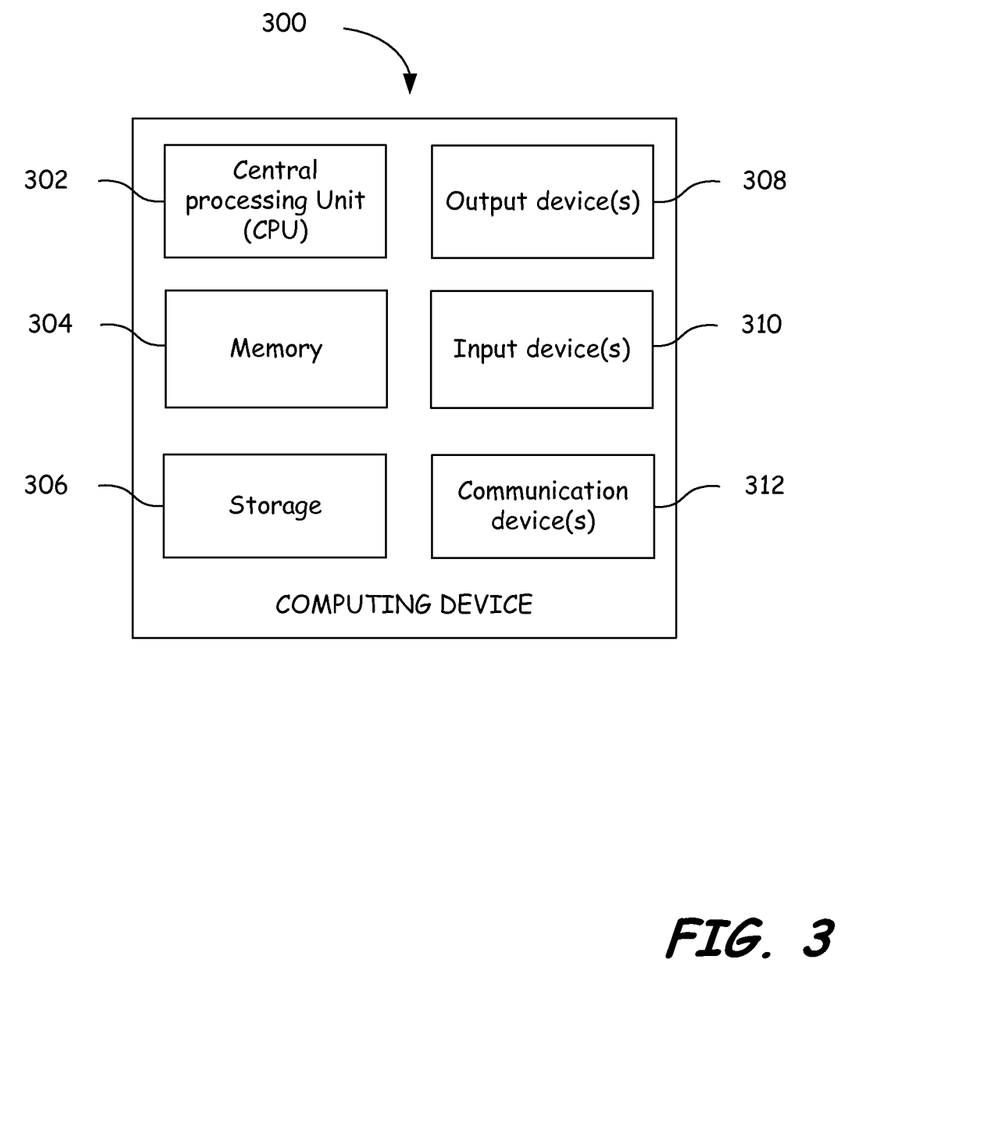
FIG. 3 illustrates a component diagram of a computing device according to one embodiment.

FIG. 3 illustrates a component diagram of a computing device according to one embodiment. The computing device 300 can be utilized to implement one or more computing devices, computer processes, or software modules described herein. In one example, the computing device 300 can be utilized to process calculations, execute instructions, receive and transmit digital signals. In another example, the computing device 300 can be utilized to process calculations, execute instructions, receive and transmit digital signals, receive and transmit search queries, and hypertext, compile computer code, as required by the system of the present embodiments. Further, computing device 300 can be a distributed computing device where components of computing device 300 are located on different computing devices that are connected to each other through network or other forms of connections. Additionally, computing device 300 can be a cloud based computing device.

The computing device 300 can be any general or special purpose computer now known or to become known capable of performing the steps and/or performing the functions described herein, either in software, hardware, firmware, or a combination thereof.

In its most basic configuration, computing device 300 typically includes at least one central processing unit (CPU) 302 and memory 304. Depending on the exact configuration and type of computing device, memory 304 may be volatile (such as RAM), non-volatile (such as ROM, flash memory, etc.) or some combination of the two. Additionally, computing device 300 may also have additional features/functionality. For example, computing device 300 may include multiple CPU's. The described methods may be executed in any manner by any processing unit in computing device 300. For example, the described process may be executed by both multiple CPU's in parallel.

Computing device 300 may also include additional storage (removable and/or non-removable) including, but not limited to, magnetic or optical disks or tape. Such additional storage is illustrated in FIG. 3 by storage 306. Computer storage media includes volatile and nonvolatile, removable and non-removable media implemented in any method or technology for storage of information such as computer readable instructions, data structures, program modules or other data. Memory 304 and storage 306 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 300. Any such computer storage media may be part of computing device 300.

Computing device 300 may also contain communications device(s) 312 that allow the device to communicate with other devices. Communications device(s) 312 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both computer storage media and communication media. The described methods may be encoded in any computer-readable media in any form, such as data, computer-executable instructions, and the like.

Computing device 300 may also have input device(s) 310 such as keyboard, mouse, pen, voice input device, touch input device, etc. Output device(s) 308 such as a display, speakers, printer, etc. may also be included. All these devices are well known in the art and need not be discussed at length.

Those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

In summary the present disclosure is directed to a method for identifying informative features in a classifier. The method begins by processing a first data set through the classifier to obtain a first classification for the first data set. Next the first data set is perturbed to obtain at least one perturbed data set. The at least one perturbed data set is processed through the classifier to obtain at least a second classification. Next the first classification is compared with the second classification to determine a difference between the first classification and the second classification. Finally a representation of the difference between the first classification and the second classification is generated.

The present disclosure also is directed to a system for identifying informative features of a data set. The system includes at least one processor and at least one memory device, a perturber configured to modify the data set to create at least one perturbed data set, a classifier configured to classify the data set according to a set of rules, the classifier further configured to classify the at least one perturbed data set according to the set of rules, and a feature comparison module configured to receive a first result from the classifier for the data set and a second result from the classifier for the at least one perturbed data set and compare the first result with the second result to generate a representation of a difference between the first result and the second result.

The invention claimed is:

1. A method for identifying informative features in a classifier for a machine learning system, the method comprising:
   processing a first data set through the classifier to obtain a first classification for the first data set;
   identifying a second data set;
   perturbing the first data set by changing or removing a single feature of a plurality of features in the first data set, and perturbing the first data set with data from the second data set to obtain at least one perturbed data set and;
   processing the at least one perturbed data set through the classifier to obtain at least a second classification;
   comparing the first classification with the second classification to determine a difference between the first classification and the second classification; and
   generating a representation of the difference between the first classification and the second classification.

2. The method of claim 1 wherein perturbing the first data set comprises replacing a value associated with the single feature in the first data set with a different value for the single feature.

3. The method of claim 1 wherein perturbing the first data set comprises replacing a value associated with each feature of the plurality of features in the first data set with a different value.

4. The method of claim 1 wherein perturbing the first data set comprises removing all but one feature of the first data set.

5. The method of claim 1 wherein the second data set is a negative data set to the first data set.

6. The method of claim 1 wherein perturbing the first data set replaces a value of the single feature in the first data set with a corresponding value for the single feature from the second data set.

7. The method of claim 1 wherein perturbing the first data set replaces a group of values of a group of features in the first data set with a corresponding group of values for the group of features from the second data set.

8. The method of claim 1 wherein perturbing the first data set creates a perturbed data set for each feature contained in the first data set.

9. The method of claim 1 further comprising:
identifying a third data set; and
perturbing the first data set with data from the third data set.

10. The method of claim 1 wherein the representation illustrates an effect of perturbing the first data set on the first classification.

11. A system for identifying informative features of a data set, the system comprising:
at least one processor and at least one memory device;
a perturber configured to modify the data set by removing all but one feature of a plurality of features in the data set and to replace the one feature in the data set with a different feature to create at least one perturbed data set;
a classifier for a machine learning system configured to classify the data set according to a set of rules, the classifier further configured to classify the at least one perturbed data set according to the set of rules; and
a feature comparison module configured to receive a first result from the classifier for the data set and a second result from the classifier for the at least one perturbed data set and compare the first result with the second result to generate a representation of a difference between the first and the second result.

12. The system of claim 11 further comprising:
a scorer, the scorer configured to provide a score related to the first result from the classifier for the data set.

13. The system of claim 11 wherein the perturber is configured to replace a group of features in the data set with a different group of features.

14. The system of claim 11 wherein the different feature is obtained from a second data set.

15. The system of claim 14 wherein the second data set is an opposite data set from the data set.

16. The system of claim 11 wherein the perturber is configured to modify the data set using a second data set and a third data set and wherein the perturber generates a plurality of perturbed data sets for the data set.

17. The system of claim 11 wherein the representation is a graphical representation of the difference between the first result and the second result and wherein the representation indicates at least one feature in the data set that was modified.

18. A computer readable storage device excluding transitory media and having computer executable instructions that when executed cause at least one computing device to:
train a classifier for a machine learning system to classify data according to a set of rules;
process a first data set through the classifier to obtain a first classification for the first data set;
identify a second data set;
perturb the first data set by changing or removing a single feature of a plurality of features in the first data set, and perturb the first data set with data from the second data set to obtain at least one perturbed data set;
process the at least one perturbed data set through the classifier to obtain at least a second classification;
compare the first classification with the second classification to determine a difference between the first classification and the second classification; and
generate a representation of the difference between the first classification and the second classification.

* * * * *

UNITED STATES PATENT AND TRADEMARK OFFICE
CERTIFICATE OF CORRECTION

PATENT NO. : 10,504,035 B2  
APPLICATION NO. : 14/748211  
DATED : December 10, 2019  
INVENTOR(S) : Hanan Shteingart et al.

Page 1 of 1

It is certified that error appears in the above-identified patent and that said Letters Patent is hereby corrected as shown below:

On the Title Page

In the Title and in the Specification, In Column 1, Line 2, delete "PERTUBATION" and insert --PERTURBATION--.

Signed and Sealed this  
Twenty-fifth Day of February, 2020

Andrei Iancu  
*Director of the United States Patent and Trademark Office*